United States Patent
Sako et al.

(10) Patent No.: US 7,366,386 B2
(45) Date of Patent: Apr. 29, 2008

(54) OPTICAL FIBER AND OPTICAL INTERCONNECTION SYSTEM

(75) Inventors: Akifumi Sako, Tokyo (JP); Ryuichi Sugizaki, Tokyo (JP); Takeshi Yagi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/271,823

(22) Filed: Nov. 14, 2005

(65) Prior Publication Data

US 2006/0198589 A1 Sep. 7, 2006

(30) Foreign Application Priority Data

| Mar. 1, 2005 | (JP) | ............................. 2005-056541 |
| Jun. 29, 2005 | (JP) | ............................. 2005-190124 |

(51) Int. Cl.
G02B 6/02 (2006.01)
(52) U.S. Cl. ...................... 385/123; 385/124; 385/127; 385/114
(58) Field of Classification Search ........ 385/122–128, 385/114
See application file for complete search history.

(56) References Cited

U.S. PATENT DOCUMENTS

| 7,116,872 B2 * | 10/2006 | Okuno et al. ............... 385/114 |
| 7,130,516 B2 * | 10/2006 | Wu et al. ................... 385/128 |
| 2002/0102082 A1 | 8/2002 | Sarchi et al. ............... 385/123 |
| 2002/0163688 A1 | 11/2002 | Zhu et al. ................... 359/124 |
| 2006/0034575 A1 | 2/2006 | Sako et al. ................. 385/127 |
| 2006/0093297 A1 | 5/2006 | Sako et al. ................. 385/126 |
| 2006/0198589 A1 | 9/2006 | Sako et al. ................. 385/123 |

FOREIGN PATENT DOCUMENTS

| EP | 0 334 247 A2 | 9/1989 |
| EP | 1 116 969 A1 | 7/2001 |
| EP | 1 329 750 A2 | 7/2003 |

OTHER PUBLICATIONS

Masataka Ikeda, et al. "Low Bending Loss Optical Fiber with Reduced Splice Loss", Technical Report of the Institute of Electronics Information and Communications Engineers (IEICE) OCS2003-43, OFT2003-25, Aug. 2003, pp. 35-40 (with English Abstract and English Translation).

Masataka Ikeda, et al. "Low Bending Loss Optical Fiber with Reduced Splice Loss", The Institute of Electronics, Information and Communication Engineers, 2004, p. 372 (with English Translation).

(Continued)

*Primary Examiner*—Kevin S. Wood
(74) *Attorney, Agent, or Firm*—Oblon, Spivak, McClelland, Maier & Neustadt, P.C.

(57) ABSTRACT

A mode field diameter of an optical fiber at a wavelength of 1300 nm is equal to or larger than 5.4 µm. A light of a wavelength of 1250 nm is propagated through the optical fiber in a single mode. A bending loss of the optical fiber with a bending radius of 1 mm at the wavelength of 1300 nm is equal to or lower than 1 dB/turn.

21 Claims, 9 Drawing Sheets

| | Δ1 [%] | α1 | Δ2 [%] | a [µm] | b [µm] | MFD [µm] | BENDING LOSS [ dB/TURN] | DISPERSION [ps/nm/km] | CUTOFF WAVELENGTH [nm] |
|---|---|---|---|---|---|---|---|---|---|
| A1 | 0.7 | 8.0 | -0.5 | 7.8 | 13.0 | 6.2 | 1.2 | 1.78 | 1243 |
| A2 | 0.8 | 8.0 | -0.5 | 7.2 | 12.0 | 5.8 | 0.6 | 1.04 | 1238 |
| A3 | 0.9 | 8.0 | -0.5 | 6.7 | 11.2 | 5.5 | 0.3 | 0.25 | 1236 |
| A4 | 0.9 | 1.4 | -0.5 | 9.7 | 19.3 | 6.3 | 1.1 | -2.15 | 1242 |
| A5 | 0.9 | 1.5 | -0.5 | 9.5 | 18.9 | 6.2 | 0.9 | -1.96 | 1243 |
| A6 | 1.2 | 1.5 | -0.1 | 7.5 | 13.6 | 5.4 | 1.1 | -9.21 | 1238 |
| A7 | 1.2 | 1.5 | -0.2 | 7.8 | 14.1 | 5.5 | 0.6 | -7.40 | 1244 |
| A8 | 1.2 | 1.5 | -0.3 | 7.9 | 14.3 | 5.4 | 0.4 | -6.24 | 1238 |
| A9 | 1.2 | 1.5 | -0.4 | 8.0 | 14.5 | 5.4 | 0.3 | -5.27 | 1238 |
| A10 | 1.2 | 1.5 | -0.5 | 8.1 | 14.7 | 5.4 | 0.2 | -4.47 | 1244 |
| A11 | 1.2 | 1.5 | -0.6 | 8.1 | 14.8 | 5.4 | 0.1 | -3.81 | 1242 |
| A12 | 1.1 | 2.0 | -0.4 | 7.7 | 15.4 | 5.5 | 0.3 | -3.5 | 1240 |

OTHER PUBLICATIONS

Timothy C. Starkey, et al., "Reduced Mode-Field Diameter Single-Mode Fiber For Specialty Applications", International Wire & Cable Symposium Proceedings, vol. 37, XP-009036808, Nov. 15, 1988, pp. 591-592.

Shoichiro Matsuo, et al., "Bend-Insensitive and Low-Splice-Loss Optical fiber for Indoor Wiring in FTTH", Optical Fiber Communication Conference, vol. 2, XP-010745853, Feb. 26, 2004, pp. 157-159.

U.S. Appl. No. 11/909,162, filed Sep. 20, 2007, Sako et al.

* cited by examiner

| | Δ1 [%] | α1 | Δ2 [%] | a [μm] | b [μm] | MFD [μm] | BENDING LOSS [dB/TURN] | DISPERSION [ps/nm/km] | CUTOFF WAVELENGTH [nm] |
|---|---|---|---|---|---|---|---|---|---|
| A1 | 0.7 | 8.0 | -0.5 | 7.8 | 13.0 | 6.2 | 1.2 | 1.78 | 1243 |
| A2 | 0.8 | 8.0 | -0.5 | 7.2 | 12.0 | 5.8 | 0.6 | 1.04 | 1238 |
| A3 | 0.9 | 8.0 | -0.5 | 6.7 | 11.2 | 5.5 | 0.3 | 0.25 | 1236 |
| A4 | 0.9 | 1.4 | -0.5 | 9.7 | 19.3 | 6.3 | 1.1 | -2.15 | 1242 |
| A5 | 0.9 | 1.5 | -0.5 | 9.5 | 18.9 | 6.2 | 0.9 | -1.96 | 1243 |
| A6 | 1.2 | 1.5 | -0.1 | 7.5 | 13.6 | 5.4 | 1.1 | -9.21 | 1238 |
| A7 | 1.2 | 1.5 | -0.2 | 7.8 | 14.1 | 5.5 | 0.6 | -7.40 | 1244 |
| A8 | 1.2 | 1.5 | -0.3 | 7.9 | 14.3 | 5.4 | 0.4 | -6.24 | 1238 |
| A9 | 1.2 | 1.5 | -0.4 | 8.0 | 14.5 | 5.4 | 0.3 | -5.27 | 1238 |
| A10 | 1.2 | 1.5 | -0.5 | 8.1 | 14.7 | 5.4 | 0.2 | -4.47 | 1244 |
| A11 | 1.2 | 1.5 | -0.6 | 8.1 | 14.8 | 5.4 | 0.1 | -3.81 | 1242 |
| A12 | 1.1 | 2.0 | -0.4 | 7.7 | 15.4 | 5.5 | 0.3 | -3.5 | 1240 |

| | Δ1 [%] | α1 | Δ2 [%] | Δ3 [%] | a [μm] | b [μm] | c [μm] | MFD [μm] | BENDING LOSS [dB/TURN] | DISPERSION [ps/nm/km] | CUTOFF WAVELENGTH [nm] |
|---|---|---|---|---|---|---|---|---|---|---|---|
| B1 | 0.7 | 6.0 | -0.5 | 0.2 | 8.0 | 14.5 | 18.9 | 6.2 | 1.9 | 1.72 | 1237 |
| B2 | 0.8 | 6.0 | -0.5 | 0.2 | 7.4 | 13.5 | 17.6 | 5.9 | 0.8 | 1.09 | 1241 |
| B3 | 1.1 | 1.4 | -0.3 | 0.2 | 8.3 | 12.7 | 15.2 | 5.7 | 1.1 | -6.23 | 1241 |
| B4 | 1.1 | 1.5 | -0.3 | 0.2 | 8.1 | 12.4 | 14.9 | 5.6 | 0.9 | -6.23 | 1240 |
| B5 | 1.2 | 1.5 | -0.1 | 0.2 | 7.2 | 13.0 | 15.6 | 5.4 | 1.2 | -10.57 | 1243 |
| B6 | 1.2 | 1.5 | -0.2 | 0.2 | 7.6 | 13.8 | 16.6 | 5.4 | 0.6 | -7.88 | 1239 |
| B7 | 1.2 | 1.5 | -0.3 | 0.2 | 7.8 | 14.2 | 19.5 | 5.4 | 0.3 | -6.38 | 1237 |
| B8 | 1.2 | 1.5 | -0.4 | 0.2 | 8.0 | 14.5 | 17.4 | 5.4 | 0.2 | -5.29 | 1241 |
| B9 | 1.0 | 2.5 | -0.4 | 0.3 | 7.6 | 13.8 | 16.6 | 5.6 | 0.5 | -2.5 | 1244 |
| B10 | 1.0 | 2.5 | -0.4 | 0.4 | 7.3 | 13.3 | 16.0 | 5.5 | 0.6 | -3.1 | 1240 |
| B11 | 1.0 | 2.5 | -0.4 | 0.5 | 6.5 | 11.9 | 14.3 | 5.2 | 1.6 | -6.2 | 1245 |

| | Δ1 [%] | α1 | Δ2 [%] | Δ3 [%] | a [μm] | b [μm] | c [μm] | MFD [μm] | BENDING LOSS [dB/TURN] | DISPERSION [ps/nm/km] | CUTOFF WAVELENGTH [nm] |
|---|---|---|---|---|---|---|---|---|---|---|---|
| C1 | 0.7 | 8.0 | 0.0 | -0.5 | 7.4 | 8.2 | 10.7 | 6.2 | 2.0 | -0.35 | 1236 |
| C2 | 0.8 | 8.0 | 0.0 | -0.5 | 6.8 | 7.6 | 9.9 | 5.9 | 0.9 | -1.32 | 1236 |
| C3 | 0.9 | 8.0 | 0.0 | -0.5 | 6.4 | 7.1 | 9.2 | 5.5 | 0.4 | -2.35 | 1234 |
| C4 | 1.0 | 1.4 | 0.0 | -0.5 | 8.6 | 10.8 | 14.0 | 6.0 | 1.1 | -5.49 | 1240 |
| C5 | 1.0 | 1.5 | 0.0 | -0.5 | 8.5 | 10.6 | 13.8 | 6.0 | 0.9 | -5.32 | 1244 |
| C6 | 1.2 | 1.5 | 0.0 | -0.1 | 7.3 | 8.6 | 11.2 | 5.5 | 1.3 | -10.34 | 1245 |
| C7 | 1.2 | 1.5 | 0.0 | -0.2 | 7.5 | 8.8 | 11.4 | 5.5 | 0.8 | -9.11 | 1246 |
| C8 | 1.2 | 1.5 | 0.0 | -0.3 | 7.6 | 8.9 | 11.6 | 5.5 | 0.5 | -8.26 | 1240 |
| C9 | 1.2 | 1.5 | 0.0 | -0.4 | 7.7 | 9.0 | 11.7 | 5.5 | 0.4 | -7.51 | 1239 |

|    | Δ1 [%] | α1  | a [μm] | MFD [μm] | BENDING LOSS [dB/TURN] | DISPERSION [ps/nm/km] | CUTOFF WAVELENGTH [nm] |
|----|--------|-----|--------|----------|------------------------|-----------------------|------------------------|
| D1 | 1.3    | 2.0 | 6.2    | 5.0      | 0.7                    | -13.33                | 1232                   |
| D2 | 1.1    | 2.0 | 6.8    | 5.5      | 2.3                    | -10.68                | 1243                   |

OPTICAL FIBER AND OPTICAL INTERCONNECTION SYSTEM

BACKGROUND OF THE INVENTION

1. Field of the Invention

The present invention relates to an optical fiber having a small bending loss.

2. Description of the Related Art

An electric transmission and optical interconnection are two representative methods for transmitting a signal in an apparatus.

Along with recent acceleration of a clock frequency of a central processing unit (CPU), the electric transmission has a problem that a cross-talk occurs due to a high density interconnection, necessitating an application of a waveform shaping technique to the electric transmission. As a result, it is discovered that if the electric transmission is adopted as the signal transmission in the apparatus, the transmission is limited to a transmission distance of 1 meter and a transmission rate of about 10 Gigabits per second (Gbps).

Meanwhile, the optical interconnection is capable of transmitting a signal in a far broader bandwidth than that of the electric transmission, and constructing a signal transmission system using small-sized, low power consumption optical components. Attention has been, therefore, paid to the optical interconnection as an inter-apparatus signal transmission technique.

Furthermore, as an optical transmission means for the optical interconnection, attention has been paid to a technique using an optical fiber. It is desirable to save a space for storing all optical components employed to make a size of the apparatus compact. As for the optical fiber for the optical interconnection, a flexible wiring capability and a low splicing loss is highly desired.

As an uncooled light source for an access system, Ethernet®, or a fiber channel, attention has been paid to a vertical-cavity surface-emitting laser (VCSEL) that operates at a direct modulation rate of 2.5 Gbps to 10 Gbps. Compared with an edge-emitting laser such as a distributed feedback (DFB) laser, the VCSEL has features of emitting a laser beam vertically from a surface of a substrate, easy formation of a multi-channel array, operation at a low threshold and low power consumption, a high reflectivity of an emitting surface and strong property against a return light (isolator-free laser), and a circular beam shape for an easy coupling with an optical fiber with a high coupling efficiency (lens-free laser).

Since the number of components such as the isolator and the lens can be reduced, the VCSEL is a device that can realize cost reduction of a module. The VCSEL using a GaAs/AlGaAs quantum well layer as an active layer and operating in a wavelength band of 850 nm has been already spread widely as a de facto standard of a laser for a short-haul communication. Examples of the typical optical fiber for this purpose include a silica-based grated-index optical fiber that is one type of a multimode fiber (MMF).

The MMF characteristically has a core diameter about ten times as large as that of a single-mode fiber (SMF) with a large numerical aperture. Accordingly, the MMF does not require high accuracy for splicing the optical components, e.g., splicing optical fibers to each other or splicing the optical fiber to a light source, which ensures an easy splicing.

In recent years, with a view of realizing a higher rate transmission, use of the SMF having a lower loss and a wider bandwidth, as compared with the MMF, has been considered. As a light source, attention is paid to the VCSEL having an oscillation wavelength in a wavelength band of 1.3 µm (1300±50 nm) that is a bandwidth in which the silica-based optical fiber shows a low loss, and the VCSEL is actively researched and developed.

However, if the standard SMF specified in International Telecommunication Union Telecommunication Standard Sector (ITU-T) G.652 is used, a large bending loss occurs when it is stored in an apparatus with a predetermined radius of curvature. Therefore, the standard SMF can hardly be employed in the optical interconnection system.

As the SMF having an improved bending loss, an optical fiber having a trench type refractive index profile and having a lower diffractive index portion than a cladding provided in the cladding of the standard SMF is reported as an optical fiber suitably used in an Fiber-to-the-Home (FTTH) system, as described in Fujikura Ltd., Optics and Electronics Laboratory, Optical Process Research Section, M. IKEDA, S. MATSUO, and K. HIMENO, "Low Bending Loss Optical Fiber with Reduced Splice Loss", Technical report of the Institute of Electronics Information and Communications Engineer (IEICE), 0CS2003-43, OFT2003-25 (2003-8). However, the SMF is still unsatisfactory for the use in the optical interconnection system.

As explained above, as the optical fiber used in the optical interconnection system, a demand rises for realizing an optical fiber capable of reducing both the bending loss and the splicing loss, ensuring high rate optical transmission, and facilitating construction of the optical interconnection system.

SUMMARY OF THE INVENTION

It is an object of the present invention to solve at least the above problems in the conventional technology.

An optical fiber according to one aspect of the present invention is made of silica glass and includes a core and a cladding surrounding the core. A mode field diameter of the optical fiber at a wavelength of 1300 nm is equal to or larger than 5.4 µm. A light of a wavelength of 1250 nm is propagated through the optical fiber in a single mode. A bending loss of the optical fiber with a bending radius of 1 mm at the wavelength of 1300 nm is equal to or lower than 1 dB/turn.

An optical fiber ribbon according to another aspect of the present invention includes therein a plurality of optical fibers arranged in parallel. Each of the optical fibers is made of silica glass and includes a core and a cladding surrounding the core. A mode field diameter of the optical fiber at a wavelength of 1300 nm is equal to or larger than 5.4 µm. A light of a wavelength of 1250 nm is propagated through the optical fiber in a single mode. A bending loss of the optical fiber with a bending radius of 1 mm at the wavelength of 1300 nm is equal to or lower than 1 dB/turn.

An optical interconnection system according to still another aspect of the present invention with a communication wavelength band of 1.3 µm includes an optical fiber ribbon in which a plurality of optical fibers are arranged in parallel and a surface-emitting laser that emits an optical signal in a wavelength band of 1.3 µm to input to the optical fiber. Each of the optical fiber is made of silica glass and includes a core and a cladding surrounding the core. A mode field diameter of the optical fiber at a wavelength of 1300 nm is equal to or larger than 5.4 µm. A light of a wavelength of 1250 nm is propagated through the optical fiber in a single mode. A bending loss of the optical fiber with a bending radius of 1 mm at the wavelength of 1300 nm is equal to or lower than 1 dB/turn.

The above and other objects, features, advantages and technical and industrial significance of this invention will be better understood by reading the following detailed description of presently preferred embodiments of the invention, when considered in splicing with the accompanying drawings.

DETAILED DESCRIPTION OF THE PREFERRED EMBODIMENTS

Exemplary embodiments of the present invention will be explained in detail below with reference to the accompanying drawings.

If a silica-based optical fiber is used for an optical wiring in an apparatus, the optical fiber is required to be able to provide a flexible wiring for a compact storing. If construction of a high rate interconnection system is assumed, it is desirable that a transmission loss of the optical fiber is as close as zero. Namely, the optical fiber for the optical interconnection is required to be free from a bending loss even if bending at a very small radius of curvature is applied to the optical fiber for an optical wiring. If the optical wiring in an apparatus is actually assumed, it is assumed that bending having a radius of curvature of about 1 mm is eventually applied to several portions of the optical fiber. A necessary bending loss tolerance is, therefore, considered in view of a case that local bending is applied when providing the wiring and of worst case design. If bending having a radius of curvature of 1 mm is applied to the optical fiber by one turn (note that in this specification, to count portions in which the bending is applied (bent portions), term "turn" is used, and that a state in which the optical fiber is bent by 360 degrees is denoted as "one turn", for example, the optical fiber having four 90-degree bent portions is expressed as "the optical fiber bent by one turn" and the optical fiber having two 90-degree bent portions is expressed as "the optical fiber bent by ½ turn") and the bending loss is 1 dB or less, then the optical fiber exhibits sufficiently good bending loss characteristic, and a flexible optical wiring can be provided.

Normally, to reduce the bending loss of the conventional SMF, an effective index of a fundamental mode needs to be increased. Generally speaking, if the effective index of the fundamental mode is to be increased, a method for increasing a relative refractive-index difference $\Delta$ between a core and a cladding in a refractive index profile of the optical fiber is used. The relative refractive-index difference $\Delta$ is defined as $$\Delta = \{(n_{core} - n_{clad})/n_{core}\} \times 100 [\%] \quad (1)$$

where, $n_{core}$ and $n_{clad}$ are refractive indexes of a core and a cladding, respectively.

Figure 1:
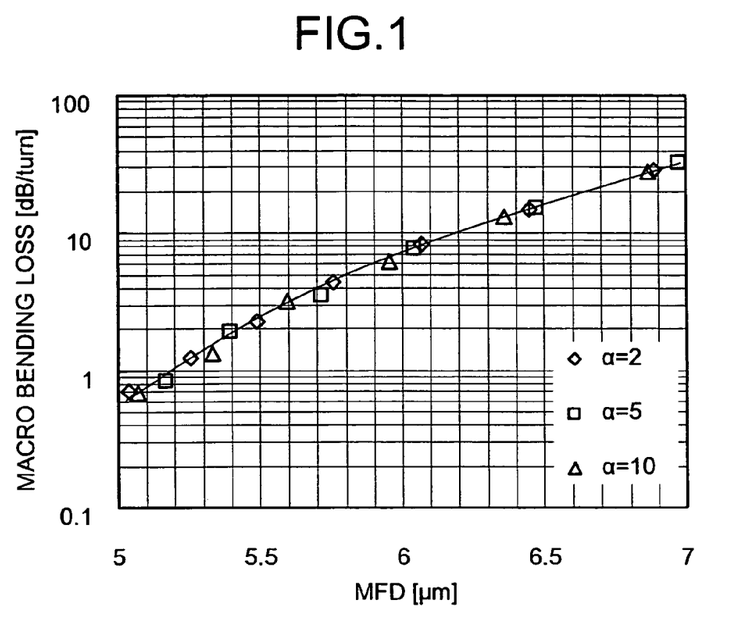
FIG. 1 is a graph of a relationship between a bending loss and an MFD in a step-index-profile optical fiber (with a bending radius and a cutoff wavelength set to 1 mm and 1300 nm, respectively)

FIG. 1 is a graph of a simulation result of a relationship between a mode field diameter (MFD) [μm] at a wavelength of 1300 nm and (bending loss at bending diameter of 1 mm)/turn [dB/turn] at the wavelength of 1300 nm when the relative refractive-index difference $\Delta$, a core diameter, and an $\alpha$ value that is a parameter for representing a refractive index profile of the core are changed. A cutoff wavelength is fixed to 1300 nm. The $\alpha$ value that represents the refractive index profile of the core is defined as $$n^2(r) = n_{core}^2 \times \{1 - 2 \times (\Delta/100) \times (2r/a)^\alpha\}, \quad (0 < r < a/2) \quad (2)$$

where, r is a position from a center of the optical fiber in a radial direction, n(r) is a refractive index at the position r, and "a" is a diameter of the core. As evident from FIG. 1, by increasing the relative refractive-index difference $\Delta$, the bending loss can be reduced. In addition, even if the $\alpha$ value is changed, the relationship between the bending loss and the MFD is not changed. Namely, in the step index profile, the relationship between the bending loss and the MFD is constant irrespective of the refractive index profile of the fist core.

On the other hand, if the bending loss is smaller, the MFD is smaller. In the step index profile of, for example, $\Delta = 1.3\%$ and $\alpha = 2.0$, the bending loss is 0.7 dB/turn but the MFD is reduced to about 5.0 μm.

To construct a communication system in the apparatus by the optical interconnection, the splicing between the optical components such as the splicing between the optical fiber and the VCSEL is considered to be established by spatial coupling. Normally, if an optical waveguide is spliced to the optical fiber or the like by the spatial coupling, a splicing loss occurs. This splicing loss T is determined according to coupling efficiency η, and can be theoretically calculated as $$T = -10 \times \log(\eta) \quad (3)$$

$$\eta = \kappa \times \exp\{-\kappa \times [(1/w_1^2 + 1/w_2^2) \times x_0^2/2]\} \quad (4)$$

$$\kappa = 4/\{(w_1/w_2 + w_2/w_1)^2 + ((\lambda \times z/(\pi \times w_1 \times w_2))^2\} \quad (5)$$

where, $w_1$ and $w_2$ are MFDs of respective optical fibers, $x_0$ is an optical axis offset amount between splicing fibers (hereinafter, "offset amount"), λ denotes a utilization wavelength, and z denotes a distance between facets of the two optical fibers. In these equations, it is assumed that optical axes of the two optical fibers are parallel.

Figure 2:
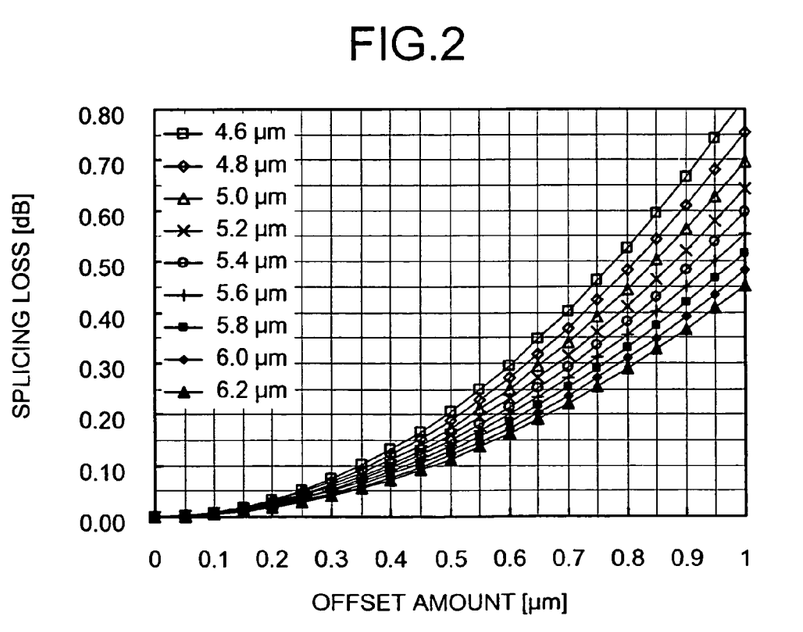
FIG. 2 is a graph of a relationship between an offset amount and a splicing loss when splicing optical fibers of the same type with different values of the MFD.

FIG. 2 is a graph of a relationship between the offset amount and the splicing loss at the wavelength of 1300 nm for the spatial splicing between the optical fibers of the same type obtained as expressed by the above equations. In FIG. 2, a horizontal axis indicates the offset amount [μm] when the optical fibers of the same type are spliced to each other, and a vertical axis indicates the splicing loss [dB] when the optical fibers of the same type are spliced to each other. It is assumed that the distance between facets of the splicing fibers is zero. As evident from FIG. 2, if the offset amount is larger, the splicing loss is larger. Furthermore, if the MFD of the splicing optical fibers is smaller, an increase in the splicing loss relative to the offset amount tends to be larger. The offset amount and the MFD are important parameters during the splicing between the optical fiber and a light source such as the VCSEL, between the optical fiber and a light receiver such as a PD, and between the optical fibers. A maximum of the offset amount due to a present manufacturing error could be about 1.0 μm. It is, therefore, necessary to design the loss so as to be able to allow the offset of 1.0 μm from the viewpoint of the worst case design.

It is assumed, for example, that a high rate optical interconnection system having the VCSEL and the PD spliced to each other by the optical fiber is constructed. An optical output of the VCSEL is set to about −10 dB and a lowest light receiving sensitivity of the PD is set to −16 dB, considering that the output tends to be lowered during high temperature operation. In this case, an optical link loss budget of about 6 dB is only secured. A specific optical wiring form will now be considered here. It is assumed that one splicing point is present between the optical fiber and the VCSEL, five splicing points are present between the optical fibers, and one splicing point is present between the optical fiber and the PD. It is also assumed that an offset of 1.0 μm is present at each splicing point from the viewpoint of the worst case design. If an MFD of 4 μm to 6 μm and an angle offset amount of 3 degrees are present between the VCSEL and the optical fiber and between the optical fiber and the PD among these splicing points, a splicing loss of about 3.0 dB is generated in all. It is, therefore, necessary to set an allowable splicing loss between the optical fiber and the optical fiber to be equal to or lower than 3 dB, that is, a splicing loss per splicing point to be equal to or lower than 0.6 dB. To satisfy this condition, it is necessary to set the MFD to 5.4 μm at the smallest. In case of the step index profile having the bending loss reduced and having α of 1.3% and α of 2.0, the MFD of about 5.0 μm, a splicing loss of 0.70 dB at the highest is, therefore, generated per splicing point. Total splicing loss is, therefore, about 3.5 dB, so that it is difficult to construct the high rate optical interconnection system.

In designing of the optical fiber refractive index profile as explained above, if the relative refractive-index difference Δ is set large so as to reduce the bending loss, then the MFD is reduced and the splicing loss is increased. Namely, a tradeoff relationship is present between the bending loss and the splicing loss. Furthermore, as shown in FIG. 1, in the step index profile, even if the refractive index profile of the first core is changed, the tradeoff relationship is not at all improved.

The refractive index profile of the core of the optical fiber according to this embodiment is a W-shaped refractive index profile of a two-layer structure, a W-segmented type refractive index profile of a three-layer structure, or a quasi W-shaped refractive index profile. In addition, structure parameters of the profile are optimized. The tradeoff relationship between the bending loss and the splicing loss is thereby improved.

Namely, as for step index profile SMFs, if the core diameter is changed and the cutoff wavelength is determined, the optical fibers with similar MFD exhibit similar bending loss, hardly depending on the core shape. As for the W-shaped profile optical fiber having a depressed layer provided on an outer periphery of a first core to serve as a second core, the MFD can be changed at the same bending loss and the same cutoff wavelength as those of the step index profile optical fiber. By providing the depressed layer, the cutoff wavelength does not shift to a long wavelength and it is unnecessary to reduce the core diameter even if the relative refractive-index difference (Δ) of a central core is changed. If the depressed layer is provided as the second core, the shape of the first core largely influences the MFD. If the α value that represents the refractive index profile of the first core is smaller, a light confinement effect is smaller and the MFD is larger. The MFD is not influenced sensitively by a magnitude and a width of the relative refractive-index difference Δ of the depressed layer.

If the optical wiring in the apparatus is assumed, it is required to store the optical fiber compact. In addition, it is considered that bending having a small radius of curvature and a bending radius of about 5 mm caused by bending of the wiring is applied to various portions within the apparatus other than the bending having the bending radius of 1 mm. The portion, to which the bending having the bending radius of 1 mm is applied, is subjected to a heat treatment or the like so as to release a strain. However, the various portions, to which the bending having the bending radius of about 5 mm is applied, are not subject to such a treatment. As a result, if the bending having a small radius of curvature is applied to the portion of the optical fiber to which the bending having the bending diameter of about 5 mm has been applied, the optical fiber can possibly be broken by a stress strain generated in the bent regions. It is, therefore, necessary to reduce a bending-caused failure ratio.

The bending loss differs according to the bending radius. Therefore, if the bending radius is increased from 1 mm to 5 mm, the bending loss is reduced by as much as about two-figure value. Even for the optical fiber having the bending loss of 10 dB/turn at the bending radius of 1 mm, the bending loss thereof is improved to about 0.1 dB/turn at the bending radius of 5 mm. As long as the optical fiber satisfies the condition that the bending loss is 1 dB/turn at the bending radius of 1 mm, the loss change falls within a range of error even if the bending having the bending radius of about 5 mm is applied while the wiring is provided on the optical fiber.

Generally, if a cladding diameter is larger, a strain generated when the optical fiber is bent is larger and the failure ratio is higher. If the optical interconnection system is constructed using the optical fibers, for example, it is assumed that the bending having the bending radius r of about 5 mm and corresponding to one turn is applied to the optical fiber. The relationship between the cladding diameter and the fiber failure ratio obtained by a simulation is shown in FIG. 3.

Figure 3:
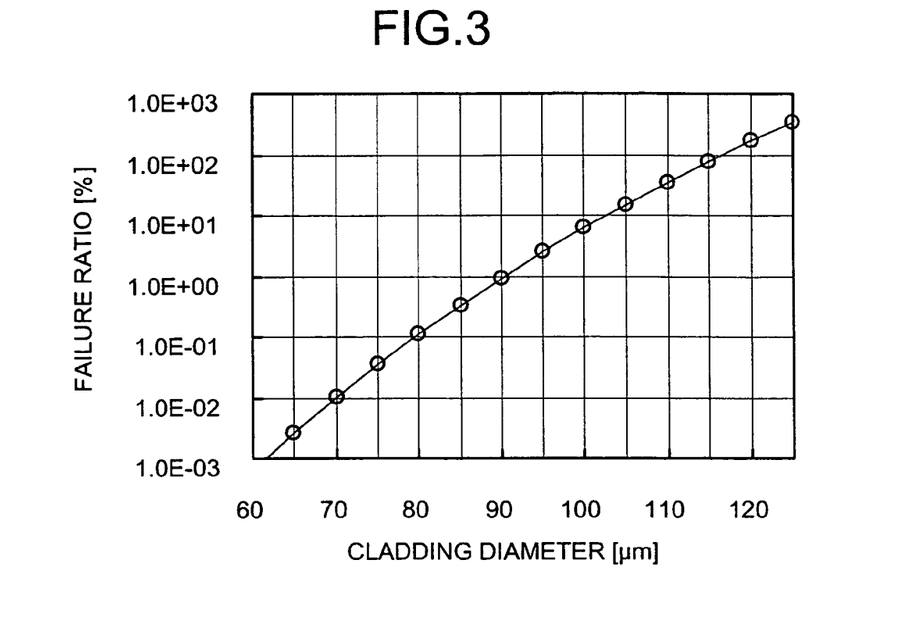
FIG. 3 is a graph of a relationship between the failure ratio and a cladding diameter at a bending radius of 5 mm, one turn, and a life span of five years.

FIG. 3 is a graph of a relationship between the failure ratio and a cladding diameter at a bending radius of 5 mm, one turn, and a life span of five years. A vertical axis of the graph indicates the failure ratio [%] and a horizontal axis thereof indicates the cladding diameter [μm]. In this simulation, a proof level is 1.5%, a fatigue parameter of the optical fiber is 18, and a product life is within five years. If the optical fiber has a cladding diameter of 125 μm, the failure ratio thereof reaches 100% within five years, making it difficult to construct the system. However, at the cladding diameter of 90 μm, the failure ratio of the optical fiber is 0.9%, which can be, therefore, reduced to about 0.3% of that of the optical fiber at the cladding diameter of 125 μm. The failure ratio is preferably within 1.0% in designing of the system. A requirement for the ordinary optical fiber to reduce the failure ratio of failure caused by the bending is not so strict because minimum bending radius of them is mainly determined by their macro bending loss value. However, as for the optical interconnection that can be bent at a small diameter, the effect of reducing the failure ratio of the failure caused by winding at the small diameter is large.

Meanwhile, it is considered that the cladding of the SMF up to about ten times as large as the MFD influences the transmission loss. It is, therefore, considered that the fiber having the MFD of 5.4 μm or more according to this embodiment needs to have the cladding diameter of at least 55 μm.

Namely, the optical fiber according to this embodiment has the cladding diameter that is reduced from 55 μm to 90 μm, whereby the failure ratio when the bending stress is applied can be reduced and wiring flexibility can be improved.

Figure 4:
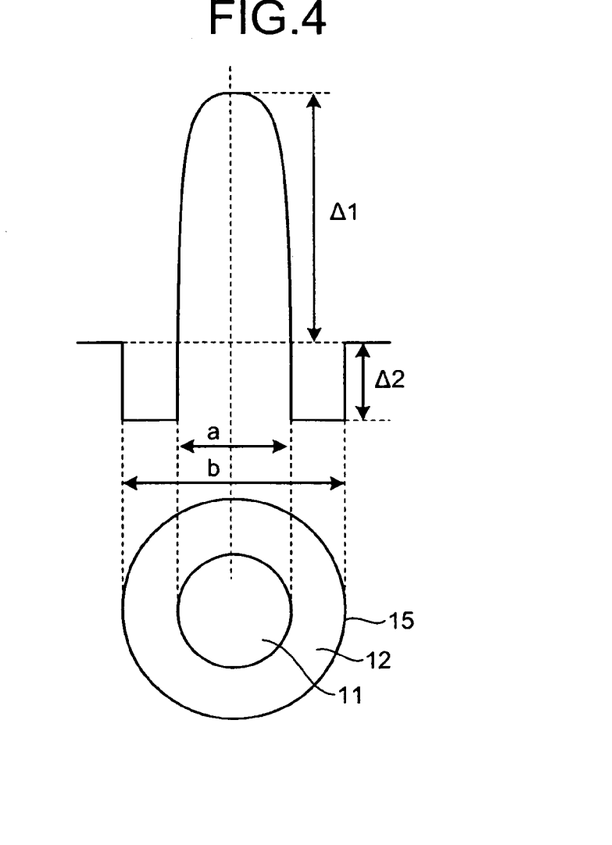
FIG. 4 is a schematic of a W-shaped refractive index profile according to a first example of the present invention.

Characteristics of an optical fiber having the W-shaped refractive index profile, consisting of silica glass, and having a cladding diameter of 80 μm as shown in FIG. 4 are calculated by a simulation. The optical fiber in this example includes a first core 11 (having a diameter a) located at a center of the optical fiber and doped with germanium, and a second core 12 (having a diameter b) surrounding the first core 11 and doped with fluorine. Furthermore, the optical fiber includes a cladding 15 surrounding the second core 12 and consisting of pure silica. In this specification, "pure silica" is defined as pure silica glass doped with no dopant which controls the refractive index.

Figure 5:
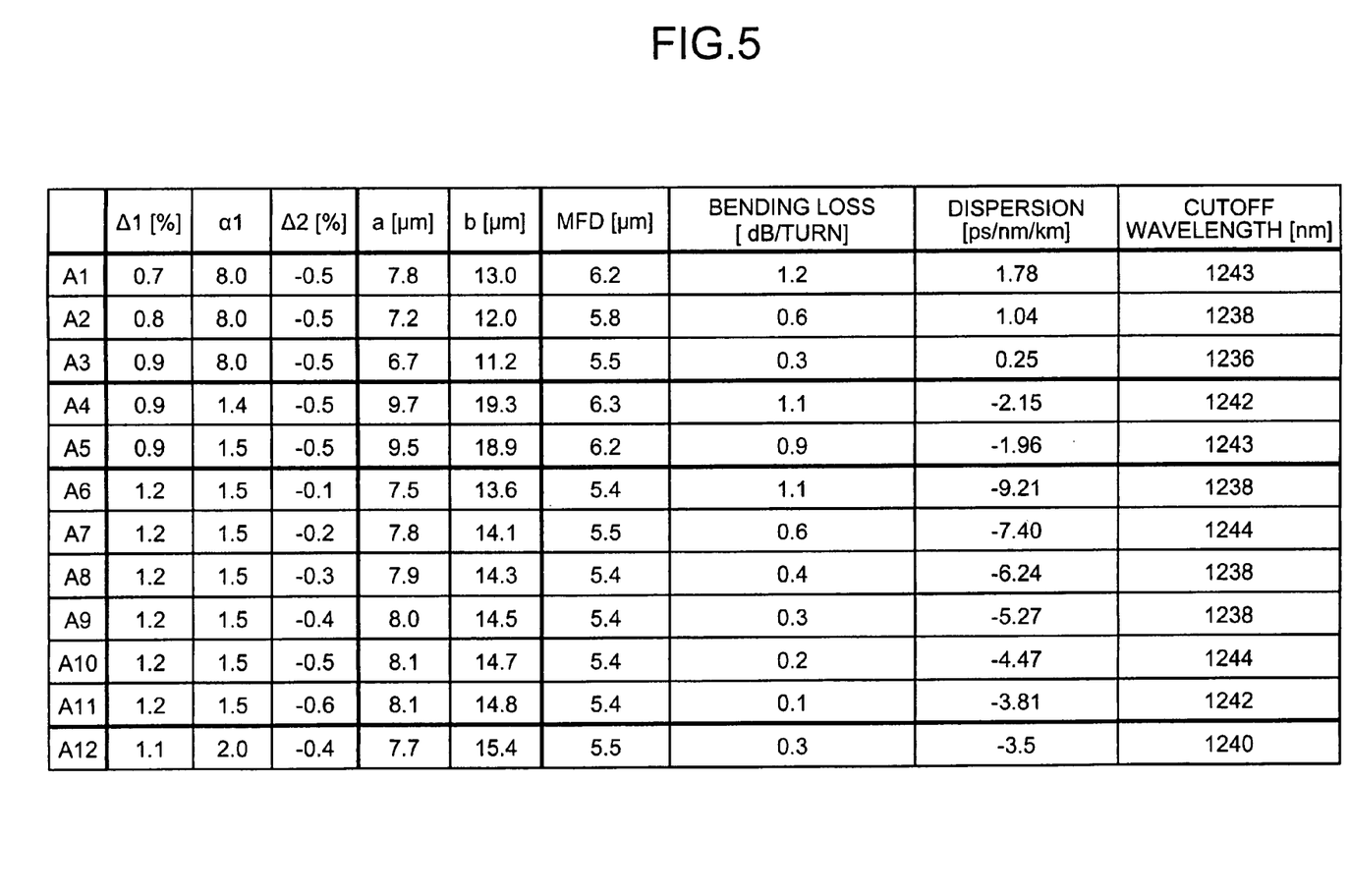
FIG. 5 is a table of characteristics when respective parameters of an optical fiber having the W-shaped refractive index profile according to the first example are changed (reference wavelength for values of the MFD, the bending loss, and the dispersion is 1300 nm)

FIG. 5 is a table of simulation results of changing respective parameters of the optical fiber having the W-shaped refractive index profile shown in FIG. 4 as optical fibers A1 to A12.

Relative refractive-index differences Δ1 and Δ2 are those of the first core 11 and the second core 12 relative to the cladding 15 and expressed by $$\Delta 1 = \{(n_{c1}-n_c)/n_c\} \times 100 [\%] \tag{6}$$

$$\Delta 2 = \{(n_{c2}-n_c)/n_c\} \times 100 [\%] \tag{7}$$

where, $n_{c1}$ is a maximum refractive index of the first core 11 (first layer), $n_{c2}$ is a minimum refractive index of the second core 12, and $n_c$ is a refractive index of the cladding 15.

In the W-shaped refractive index profile, it is assumed that the diameter a of the first core 11 is a diameter at a position at which the first core 11 is equal in refractive index to the cladding 15 on a boundary between the first core 11 and the second core 12. In addition, the diameter b of the second core 12 is a diameter at a position at which the second core 12 has a relative refractive-index difference that is half the relative refractive-index difference Δ2 on a boundary between the second core 12 and the cladding 15.

In the optical fibers A and A1 to A12 shown in FIG. 5, those having the MDF of 5.4 μm or more at the wavelength of 1300 nm, propagating a light at a wavelength of 1250 nm in a single mode, and having a bending loss of 1 dB/turn or less at a bending radius of 1 mm are the optical fibers A2, A3, A5, and A7 to A12. As evident from these simulation results, therefore, if the optical fiber having the W-shaped profile as shown in FIG. 4 is configured so that the first core 11 has the relative refractive-index difference (Δ1) of 0.8% or more, the α value is equal to or larger than 1.5, and the second core 12 has the relative refractive-index difference (Δ2) of −0.2% or less, the optical fiber according to the present invention having the desired characteristics can be obtained.

In this specification, the cutoff wavelength is assumed as a fiber cutoff wavelength λc specified in ITU-T G.650.1. In addition, terms which are not specifically defined in this specification correspond to a definition and a measuring method specified in the ITU-T G.650.1.

Figure 6:
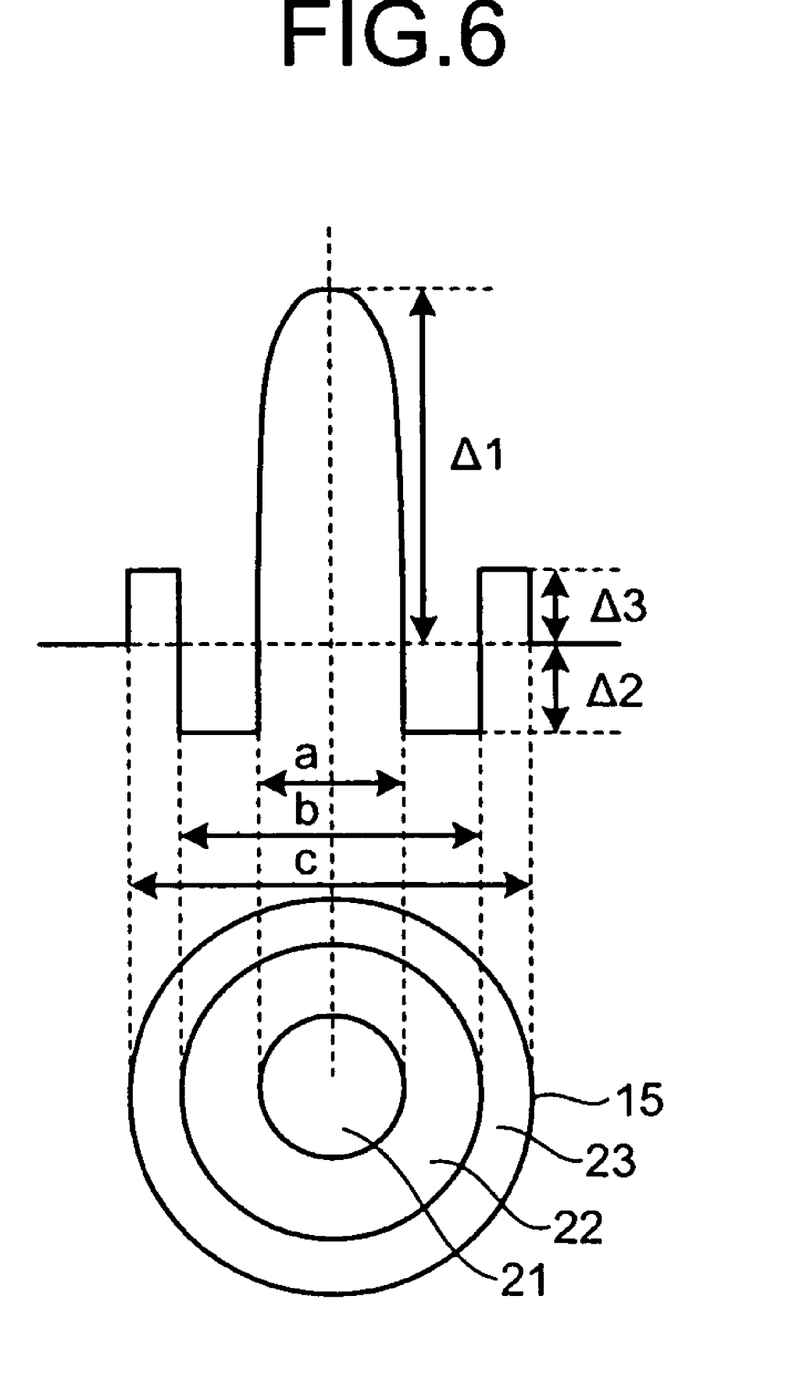
FIG. 6 is a schematic of a W-segmented type refractive index profile according to a second example of the present invention.

Characteristics of an optical fiber having the W-segmented type profile, consisting of silica glass, having a cladding diameter of 80 μm as shown in FIG. 6 are calculated by a simulation. The optical fiber in this example includes a first core 21 (having a diameter a) located at a center of the optical fiber and doped with germanium, and a second core 22 (having a diameter b) surrounding the first core 21 and doped with fluorine. Furthermore, the optical fiber includes a third core 23 (having a diameter of c) surrounding the second core 22 and doped with germanium, and the cladding 15 surrounding the third core 23 and consisting of pure silica. A relative refractive-index differences Δ3 is that of the third core 23 relative to the cladding 15 and expressed by $$\Delta 3 = \{(n_{c3}-n_c)/n_c\} \times 100 [\%] \tag{8}$$

where, $n_{c3}$ is a maximum refractive index of the third core 23 in the W-segmented type profile. In the W-segmented type profile, it is assumed that the diameter a of the first core 21 is a diameter at a position at which the first core 21 is equal in refractive index to the cladding 15 on a boundary between the first core 21 and the second core 22. In addition, the diameter b of the second core 22 is a diameter at a position at which the second core 22 has a relative refractive-index difference that is half the relative refractive-index difference Δ2 on a boundary between the second core 22 and the third core 23. The diameter c of the third core 23 is a diameter at a position at which the third core 23 has a relative refractive-index difference that is one-tenth of the relative refractive-index difference Δ3 on a boundary between the third core 23 and the cladding 15.

Figure 7:
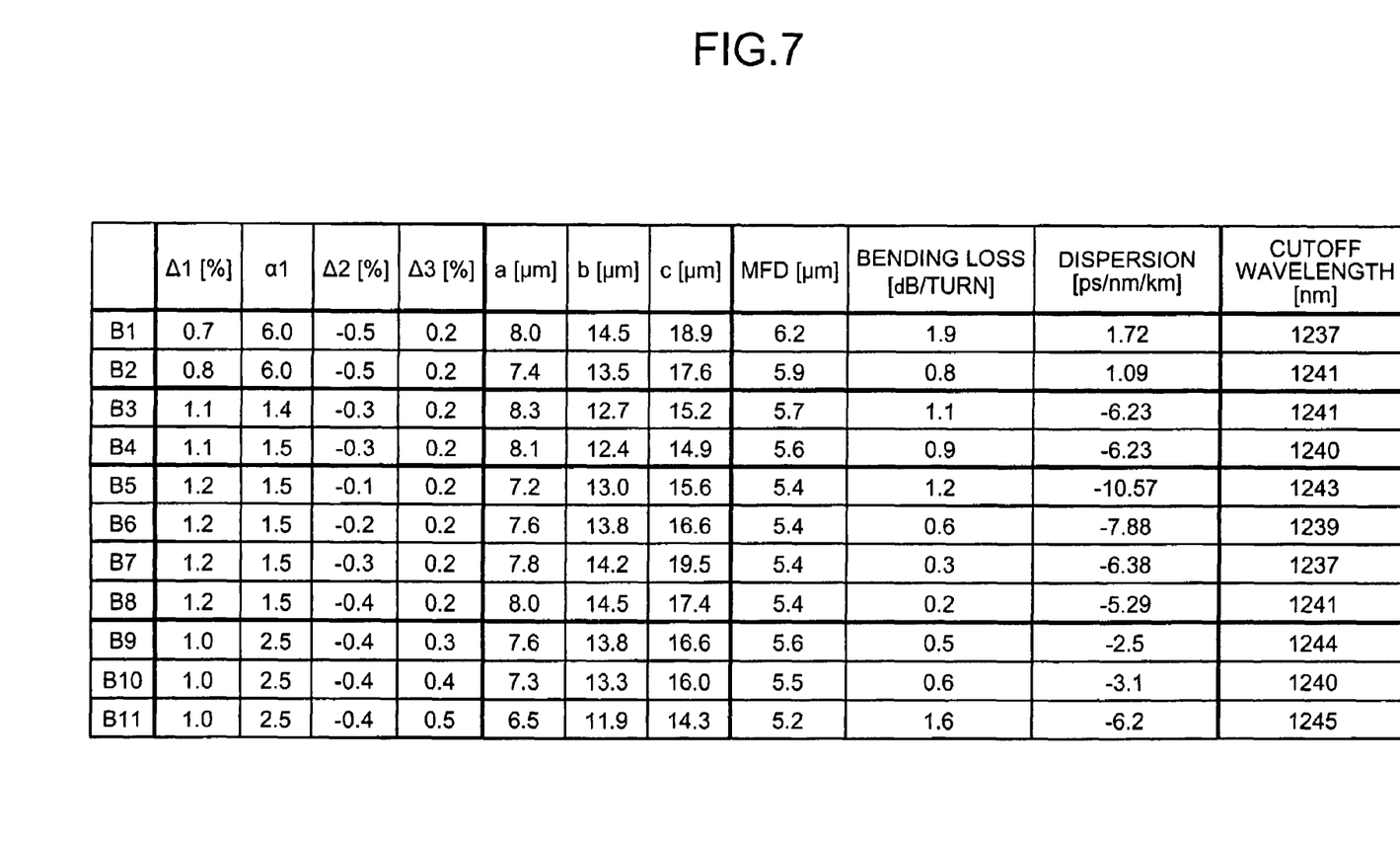
FIG. 7 is a table of characteristics when respective parameters of an optical fiber having the W-segmented type refractive index profile according to the second example are changed (reference wavelength for values of the MFD, the bending loss, and the dispersion is 1300 nm)

FIG. 7 is a table of simulation results of changing respective parameters of the optical fiber having the W-segmented type refractive index profile shown in FIG. 6 as optical fibers B1 to B11.

In the optical fibers B1 to B11 shown in FIG. 7, those having the MDF of 5.4 μm or more at the wavelength of 1300 nm, propagating a light at a wavelength of 1250 nm in a single mode, and having a bending loss of 1 dB/turn or less at a bending radius of 1 mm are the optical fibers B2, B4, and B6 to B10. As evident from these simulation results, therefore, if the optical fiber having the W-segmented type profile as shown in FIG. 6 is configured so that the first core 21 has the relative refractive-index difference (Δ1) of 0.8% or more, the α value is equal to or larger than 1.5, the second core 22 has the relative refractive-index difference (Δ2) of −0.2% or less, and the third core 23 has the relative refractive-index difference (Δ3) of 0.4% or less, an optical fiber having the desired characteristics can be obtained.

Figure 8:
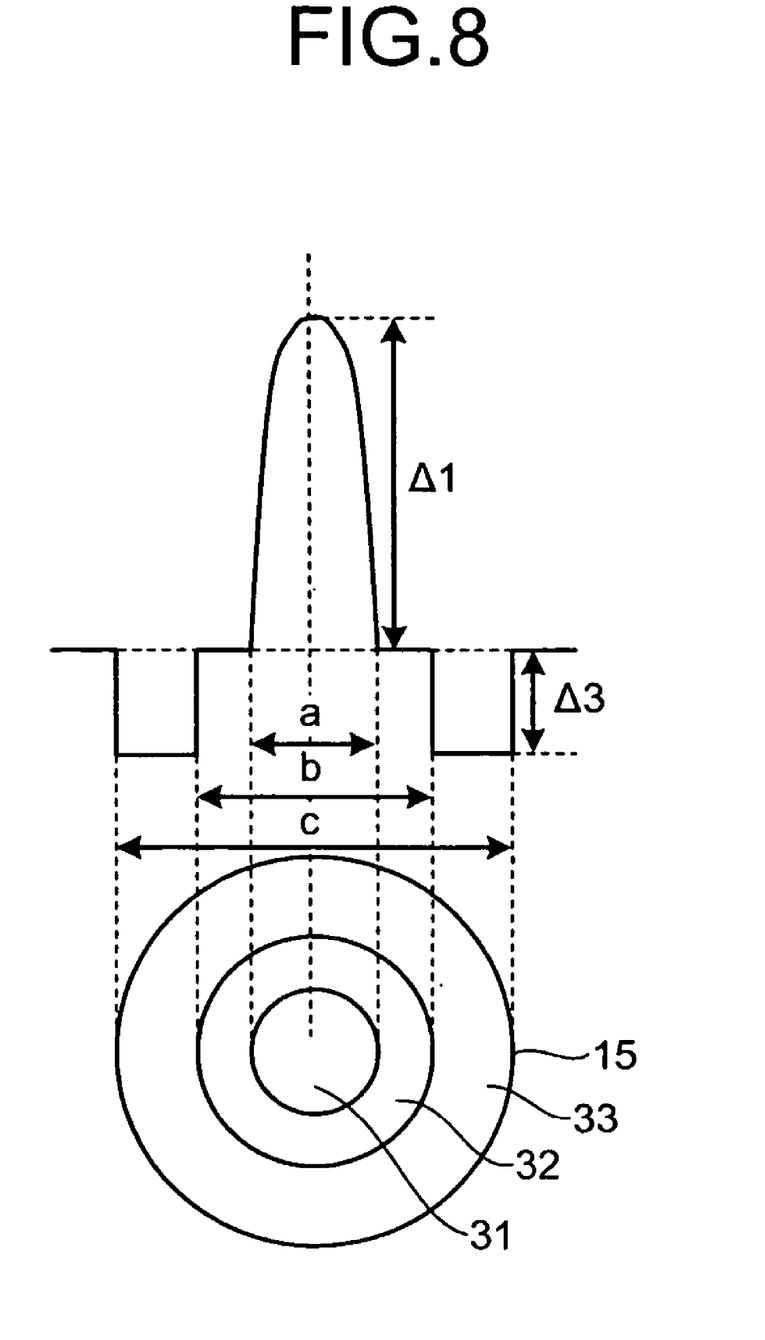
FIG. 8 is a schematic of a quasi W-segmented type refractive index profile according to a third example of the present invention.

Characteristics of an optical fiber having a quasi W-shaped profile, consisting of silica glass, having a cladding diameter of 80 μm as shown in FIG. 8 are calculated by a simulation. The optical fiber in this example includes a first core 31 (having a diameter a) located at a center of the optical fiber and doped with germanium, and a second core 32 (having a diameter b) surrounding the first core 31 and consisting of pure silica glass. Furthermore, the optical fiber includes a third core 33 (having a diameter of c) surrounding the second core 32 and doped with germanium, and the cladding 15 surrounding the third core 33. It is noted that nc3 denotes a minimum refractive index of the third core 33 in the quasi W-shaped profile. The relative refractive-index difference Δ3 is that of the third core 33 relative to the cladding 15 and expressed by $$\Delta 3 = \{(n_{c3} - n_c)/n_c\} \times 100[\%] \quad (9)$$

where, $n_{c3}$ is a minimum refractive index of the third core 33 in the quasi W-shaped profile. In the quasi W-shaped profile, it is assumed that the diameter a of the first core 31 is a diameter at a position at which the first core 31 has is a relative refractive-index difference that is one-tenth of the relative index difference Δ1 on a boundary between the first core 31 and the second core 32. The diameter b of the second core 32 is a diameter at a position at which the second core 32 has a relative refractive-index difference that is half the relative refractive-index difference Δ3 on a boundary between the second core 32 and the third core 33. The diameter c of the third core 33 is a diameter at a position at which the third core 33 has a relative refractive-index difference that is a half of the relative refractive-index difference Δ3 on a boundary between the third core 33 and the cladding 15.

Figure 9:
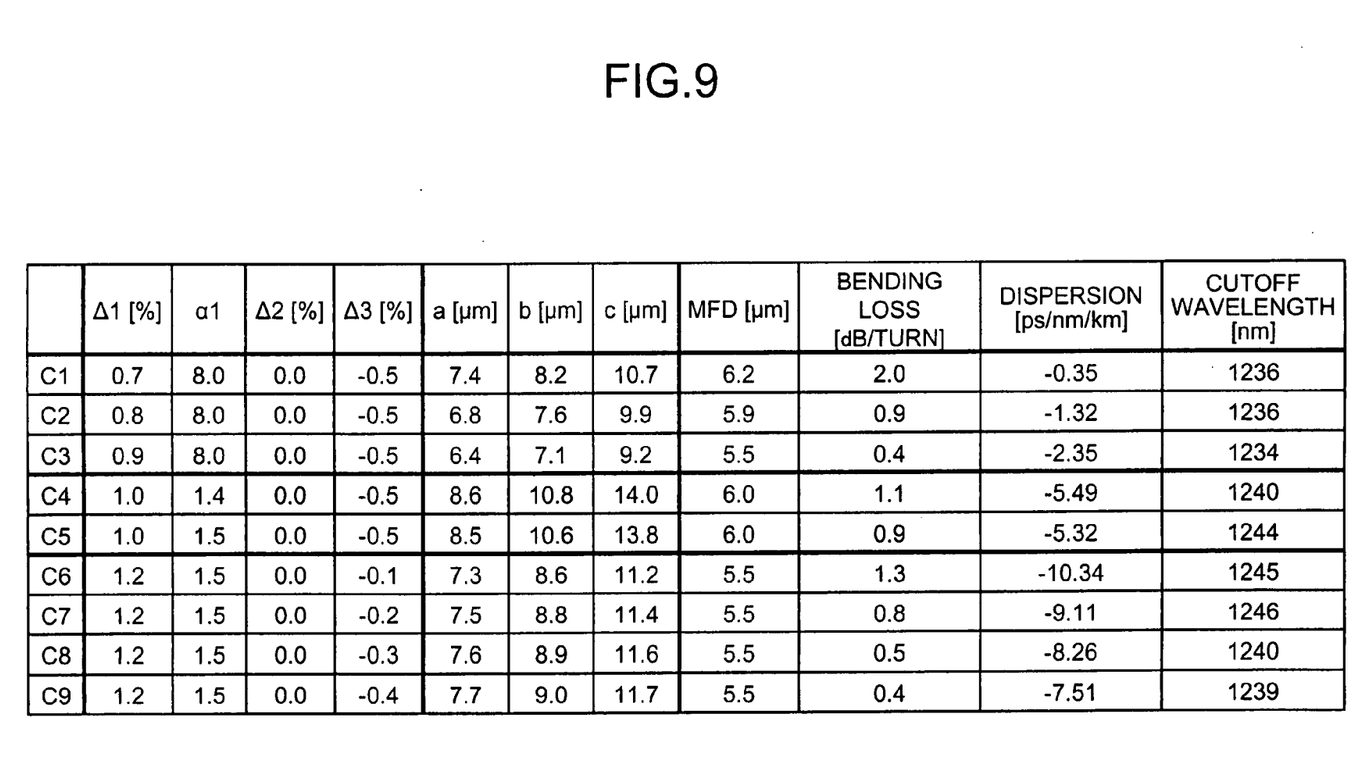
FIG. 9 is a table of characteristics when respective parameters of an optical fiber having the quasi W-shaped refractive index profile according to the third example are changed (reference wavelength for values of the MFD, the bending loss, and the dispersion is 1300 nm)

FIG. 9 is a table of simulation results of changing respective parameters of the optical fiber having the quasi W-shaped refractive index profile shown in FIG. 9 as optical fibers C1 to C9. In the optical fibers C1 to C9 shown in FIG. 9, those having the MDF of 5.4 μm or more at the wavelength of 1300 nm, propagating a light at a wavelength of 1250 nm in a single mode, and having a bending loss of 1 dB/turn or less at a bending radius of 1 mm are the optical fibers C2, C4, C5, and C7 to C9. As evident from these simulation results, therefore, if the optical fiber having the quasi W-shaped profile as shown in FIG. 9 is configured so that the first core 31 has the relative refractive-index difference (Δ1) of 0.8% or more, the α value is equal to or larger than 1.5, the second core 32 has the relative refractive-index difference (Δ2) of substantially 0.0%, and the third core 33 has the relative refractive-index difference (Δ3) of −0.2% or less, the optical fiber according to the present invention having the desired characteristics can be obtained.

Although the relative refractive-index difference (Δ2) of the second core 32 may be in a range between −0.05% and 0.05% due to a dopant that is doped for a purpose other than an adjustment of the refractive index, such as a chlorine, it does not make a big difference in the characteristic of the optical fiber.

Figure 11:
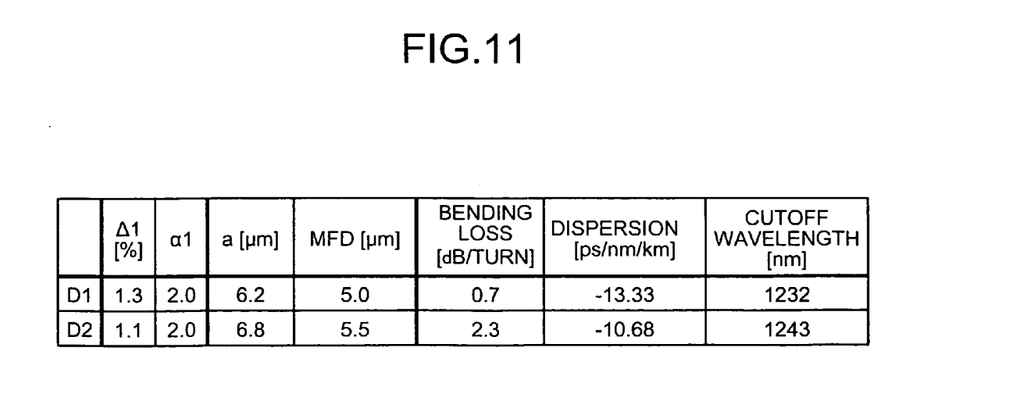
FIG. 11 is a table of characteristics when respective parameters of an optical fiber having the step index profile according to the comparison example are changed (reference wavelength for values of the MFD, the bending loss, and the dispersion is 1300 nm, and the bending radius is 1 mm)

To compare optical characteristics of the optical fiber having the step index profile with those of the optical fibers in the first to the third examples, a simulation of the optical characteristics of the single-peaked refractive index profile with the bending loss reduced is performed. The simulation results are shown in FIG. 11.

An optical fiber D1 has a bending loss of 0.7 dB/turn, which is sufficiently reduced, however, an MFD thereof is as small as 5.0 μm. An MFD of an optical fiber D2 is 5.5 μm, however, a bending loss thereof is deteriorated to 2.3 dB/turn. These results are compared with the characteristics of the W-shaped refractive index profile optical fiber A12 (having the MFD of 5.5 μm and the bending loss of 0.3 dB/turn) according to the first example. As a result, the optical fiber according to the first example exhibits the optical characteristics that cannot be realized by the optical fiber having the step index profile.

If the optical fiber is used for the optical interconnection, it is considered that an optical transmission medium is formed into multi-channel type and a high rate optical communication is established by forming a ribbon from optical fibers. Normally, the silica-based fiber has the following specifications. An outside diameter after coating is 250 μm relative to the cladding diameter of 125 μm. A pitch of an optical fiber ribbon obtained by arranging a plurality of optical fibers in parallel and bonding the optical fibers to one another is normally 250 μm. As for a small-diameter optical fiber having a reduced outside diameter, a coating diameter is also reduced. It is, therefore, possible to manufacture an optical fiber ribbon having a narrower pitch than that of the conventional optical fiber ribbon. Accordingly, it is preferable to employ small-diameter optical fibers each having a cladding diameter of 55 to 90 μm. The optical fiber ribbon using the small-diameter optical fibers and having the narrow pitch has a high wiring flexibility and can be stored in a saved space. The optical fiber ribbon is, therefore, an optical component suited for the optical interconnection.

Figure 10:
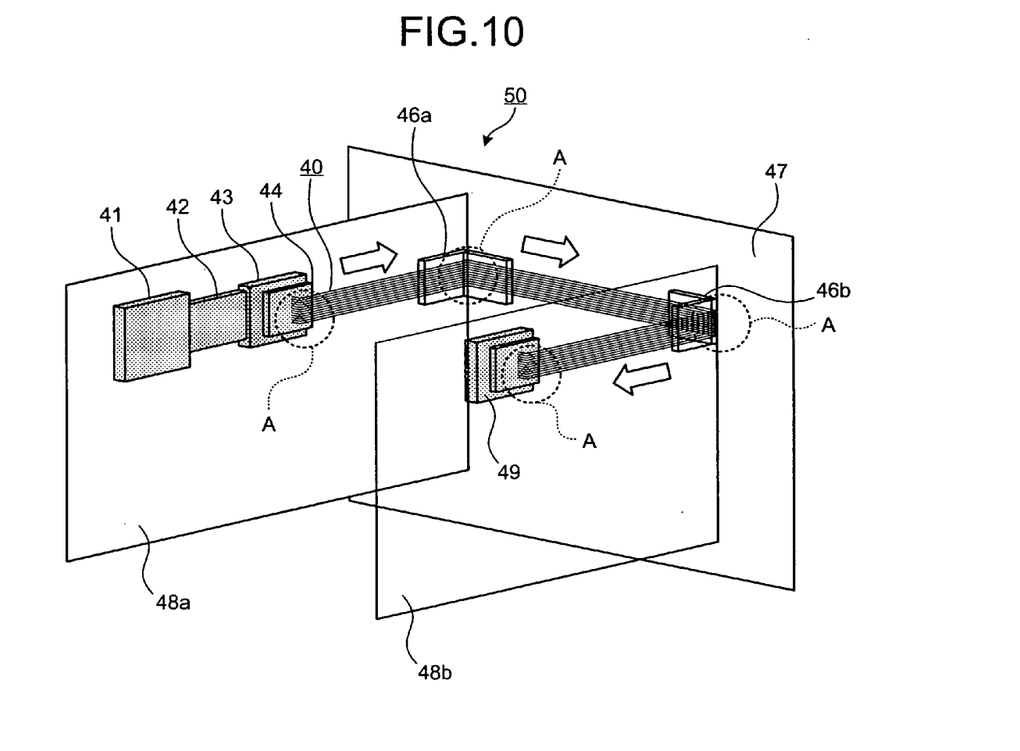
FIG. 10 is a perspective view of an example of a configuration of an optical interconnection system according to the present invention.

As shown in the calculation results according to the first to the third examples, the optical fiber according to the present invention can transmit a light in a single mode in a 1.3-μm band, and has excellent bending loss characteristics and splicing loss characteristics. FIG. 10 depicts an example of a configuration of an optical interconnection system that uses optical fibers according to the present invention as a transmission medium, and that uses the VCSEL having an oscillation wavelength in a 1.3-μm band as a light source.

An optical interconnection system 50 as shown in FIG. 10 is constructed. With reference to FIG. 10, two printed-circuit boards 48a and 48b are provided to stand on one surface of a back plane 47 with one side of each board supported by the one surface. The two printed-circuit boards 48a and 48b are provided to face each other at a predetermined distance kept therebetween. A VCSEL 44 and an LSI 41 mounted on a driver 43 are provided on a surface of one printed-circuit board 48a which surface faces the other printed-circuit board 48b. The LSI 41 and the VCSEL 44 are electrically spliced to each other by an electric wiring 42. A PD 49 is provided on a surface of the other printed-circuit board 48b which surface faces one printed-circuit board 48a. The VCSEL 44 is electrically spliced to the PD 49 by an optical fiber ribbon 40 obtained by integrating a plurality of optical fibers shown in the first to the third examples into a flat band. The optical fiber ribbon 40 is configured to extend first along the principal surface of one printed-circuit board 48a, be bent generally at right angle by a first connector 46a, progress on the back plane 47, be bent generally at right angle by a second connector 46b, extend along the principal surface of the other printed-circuit board 448b, and reach the PD 49.

Figure 12:
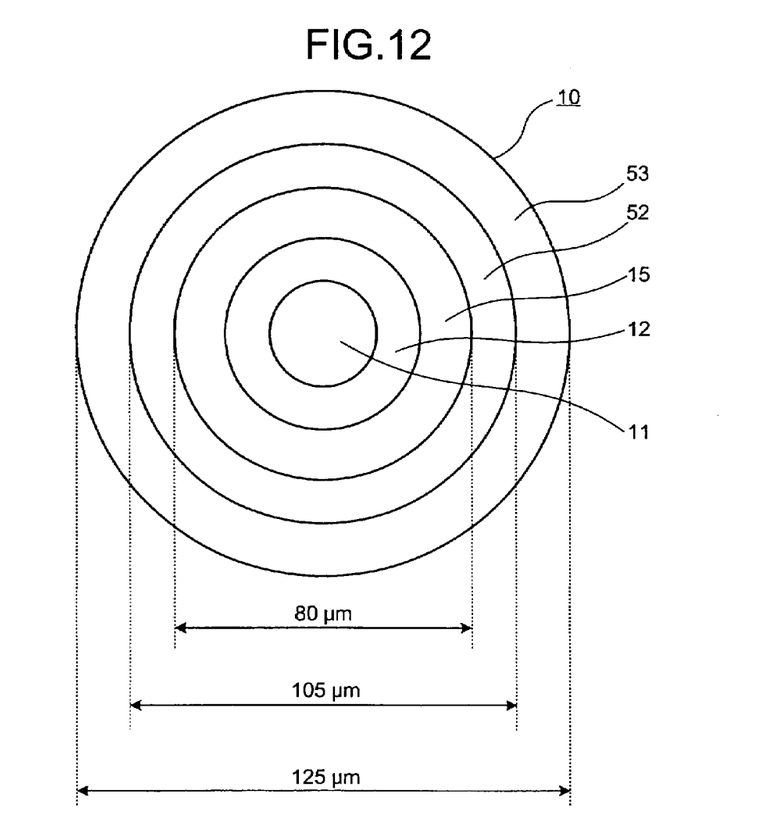
FIG. 12 is a cross section of a small-diameter optical fiber according to a fourth example of the present invention.
Figure 13:
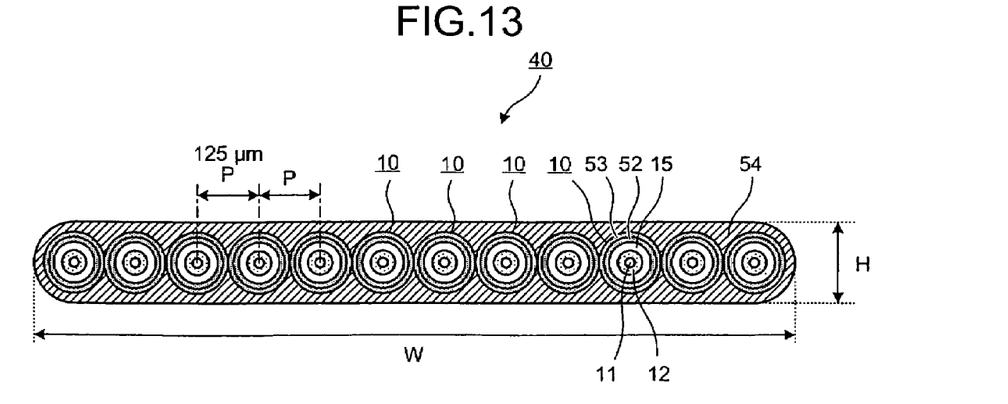
FIG. 13 is a cross section of a small-diameter optical fiber ribbon including twelve optical fibers according to the fourth example.

By thus arranging the optical fibers, the optical fiber ribbon 40 has four bent portions A each having a radius of curvature of about 1 mm and a quarter turn. Bent portions (not shown) having a bending radius of about 5 mm and about one turn in total are given to the optical fiber ribbon 40 due to bending of the optical fibers or the like. As an optical fiber 10, the optical fiber A3 configured so that a diameter of the cladding 15 is 80 µm, an outside diameter of a primary coating resin 52 is 105 µm, and an outside diameter of a secondary coating resin 53 is 125 µm is used as shown in FIG. 12. As shown in FIG. 13, the optical fiber ribbon 40 is formed by arranging 12 optical fibers 10 in parallel at a pitch of 125 µm, coating the optical fibers 10 with the coating resin 54, and thereby bonding the optical fibers 10 to one another.

A coating diameter H (thickness H) is set to 170 µm in view of two factors of an increased amount of loss resulting from the coating resins 52 and 53 that are made thinner and space saving. The optical fiber ribbon 40 at the pitch P of 125 µm is of a size as half as that of a conventional optical fiber ribbon, high in flexibility, and can be stored in a saved space in an apparatus. As the coating resins 52 and 53, ultraviolet curable resin is used.

The pitch P can be reduced down to 75 µm if a small-diameter optical fiber 10 configured so that the diameter of the cladding 15 is 55 µm and so that a difference between the outside diameter of the coating and the outside diameter of the cladding 15 is 20 µm.

Finished dimensions of the optical fiber ribbon 40 are a width W of 1.55 mm and the thickness H of 0.17 mm. By providing the VCSEL that is a splicing partner and that serves as the light source to have a pitch of 125 µm and to be formed into a twelve-channel array, the collective optical splicing using the manufactured fiber ribbon 20 can be realized. In this configuration, by subjecting the VCSEL to direct modulation, very high rate optical communication at a rate exceeding 100 Gbps is realized.

Furthermore, since the cladding diameter is set to 80 µm, the bending-caused failure ratio can be reduced. The optical fiber ribbon 40 is, therefore, hardly broken even after the life of five years.

In a fifth example, a flame-retardant ribbon is manufactured using flame-retardant UV curable urethane acrylate resin as a UV curable resin that is a material for the coating resins 52 and 53 according to the fourth example. The flame-retardant UV curable urethane acrylate resin is manufactured, for example, as follows. A halogen-based additive such as bromine or chlorine, an antimonide such as antimony trioxide or triphenylantimony, a metal hydrate such as aluminum hydroxide or magnesium hydroxide, or a phosphorus compound such as phosphate is added to the resin. Alternatively, prepolymers or acryl monomers constituting the UV curable resin are halogenated with bromine or chloride and phosphorus is added to the resultant UV curable resin. By doing so, the UV curable resin is transformed into the flame-retardant UV curable resin. Among these methods, the method for adding the bromine-based flame retardant is particularly effective to provide the flame-retardant UV curable resin.

The reason that the flame-retardant UV curable resin is provided by thus changing composition is considered as follows: a surface of the resin is covered with a product generated by a decomposition reaction; a decomposition gas generated during firing forms a shield layer from the air; radicals from the halogen-based compound prohibit the continuation of firing; or the resin is formed into a three-dimensional resin by cross-linking.

An optical fiber ribbon obtained by using, as the UV curable resin for forming the optical fibers into a ribbon, UV curable urethane acrylate resin that contains aluminum hydroxide as the flame retardant is evaluated by a 60-degree gradient firing test according to JIS C3005 Standard. As a result, a flame ignited on the fibers is spontaneously extinguished in about 3.2 seconds on average, so that the optical fiber ribbon satisfies the standard. In this example, while the flame-retardant UV curable resin is used, flame-retardant plastic resin can be used instead of the flame-retardant UV curable resin.

In a sixth example, it is intended to obtain high flame retardancy by all of or a part of the coating resins 52 and 53 and the ribbon coating resin 54 according to the fourth example are formed into the flame-retardant UV curable resins. As a result, a flame ignited on the fibers of an optical fiber formed by using at least optical fiber secondary resin and the UV curable urethane acrylate resin containing the flame retardant is spontaneously extinguished in about 2.6 seconds on average in the 60-degree gradient firing test according to the JIS C3005 Standard. Thus, the optical fiber ribbon satisfies the standard.

Furthermore, a vertical firing test according to UL1581 Standard is performed on the optical fiber ribbon, and a flame is spontaneously extinguished in 5.7 seconds on average, no firing droplet is observed, and the optical fiber ribbon satisfies the UL standard. In addition, the vertical firing test is performed on the optical fiber ribbon in a state of a yarn socket. A flame is spontaneously extinguished in 7.6 seconds on average, and the optical fiber ribbon exhibits sufficient flame retardancy in both the yarn socket state and the ribbon state. In this example, while the flame-retardant UV curable resin is used, the flame-retardant plastic resin can be used instead of the flame-retardant UV curable resin.

According to the present invention, it is possible to obtain an optical fiber capable of realizing reduction in both the bending loss and the splicing loss and ensuring high rate optical transmission, and to easily construct an optical interconnection system using the optical fiber.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber made of silica glass, comprising:
    a core; and
    a cladding surrounding the core, wherein
    a mode field diameter of the optical fiber at a wavelength of 1300 nanometers is equal to or larger than 5.4 micrometers,
    a light of a wavelength of 1250 nanometers is propagated through the optical fiber in a single mode, and
    a bending loss of the optical fiber with a bending radius of 1 millimeter at the wavelength of 1300 nanometers is equal to or lower than 1 dB/turn, wherein
    the core includes
        a first core located substantially in a center of the optical fiber along a longitudinal direction and having a diameter of "a"; and
        a second core surrounding the first core and having a diameter of "b", and a relative refractive-index difference of the first core to the cladding is equal to or larger than 0.8%,
an α value is equal to or larger than 1.5,
a relative refractive-index difference of the second core to the cladding is equal to or less than −0.2%, and
a ratio b/a, defined by a ratio of the diameter "b" of the second core to the diameter "a" of the first core, is equal to or lower than 2.0.

2. The optical fiber according to claim 1, wherein
a diameter of the cladding is within a range between 55 micrometers and 90 micrometers.

3. The optical fiber according to claim 1, wherein
the optical fiber is coated with a coating made of at least one of a ultraviolet curable resin and a thermosetting resin, and
at least a part of the ultraviolet curable resin and the thermosetting resin is flame retardant.

4. An optical fiber made of silica glass, comprising:
a core; and
a cladding surrounding the core, wherein
a mode field diameter of the optical fiber at a wavelength of 1300 nanometers is equal to or larger than 5.4 micrometers,
a light of a wavelength of 1250 nanometers is propagated through the optical fiber in a single mode, and
a bending loss of the optical fiber with a bending radius of 1 millimeter at the wavelength of 1300 nanometers is equal to or lower than 1 dB/turn, wherein
the core includes
   a first core located substantially in a center of the optical fiber along a longitudinal direction and having a diameter of "a";
   a second core surrounding the first core and having a diameter of "b"; and
   a third core surrounding the second core,
a relative refractive-index difference of the first core to the cladding is equal to or larger than 0.8%,
an α value is equal to or larger than 1.5,
a relative refractive-index difference of the second core to the cladding is equal to or less than −0.2%, and
a relative refractive-index difference of the third core to the cladding is equal to or less than 0.4%, and
a ratio b/a, defined by a ratio of the diameter "b" of the second core to the diameter "a" of the first core, is equal to or lower than 1.9.

5. The optical fiber according to claim 4, wherein
a diameter of the cladding is within a range between 55 micrometers and 90 micrometers.

6. The optical fiber according to claim 4, wherein
the optical fiber is coated with a coating made of at least one of a ultraviolet curable resin and a thermosetting resin, and
at least a part of the ultraviolet curable resin and the thermosetting resin is flame retardant.

7. An optical fiber made of silica glass, comprising:
a core; and
a cladding surrounding the core, wherein
a mode field diameter of the optical fiber at a wavelength of 1300 nanometers is equal to or larger than 5.4 micrometers,
a light of a wavelength of 1250 nanometers is propagated through the optical fiber in a single mode, and
a bending loss of the optical fiber with a bending radius of 1 millimeter at the wavelength of 1300 nanometers is equal to or lower than 1 dB/turn, wherein
the core includes
   a first core located substantially in a center of the optical fiber along a longitudinal direction;
   a second core surrounding the first core; and
   a third core surrounding the second core,
a relative refractive-index difference of the first core to the cladding is equal to or larger than 0.8%,
an α value is equal to or larger than 1.5,
a relative refractive-index difference of the second core relative to the cladding is substantially 0.0%, and
a relative refractive-index difference of the third core to the cladding is equal to or less than −0.2%.

8. The optical fiber according to claim 7, wherein
a diameter of the cladding is within a range between 55 micrometers and 90 micrometers.

9. The optical fiber according to claim 7, wherein
the optical fiber is coated with a coating made of at least one of a ultraviolet curable resin and a thermosetting resin, and
at least a part of the ultraviolet curable resin and the thermosetting resin is flame retardant.

10. An optical fiber ribbon in which a plurality of optical fibers are arranged in parallel, wherein
each of the optical fibers is made of silica glass and includes a core and a cladding surrounding the core,
a mode field diameter of the optical fiber at a wavelength of 1300 nanometers is equal to or larger than 5.4 micrometers,
a light of a wavelength of 1250 nanometers is propagated through the optical fiber in a single mode, and
a bending loss of the optical fiber with a bending radius of 1 millimeter at the wavelength of 1300 nanometers is equal to or lower than 1 dB/turn, wherein
the core includes
   a first core located substantially in a center of the optical fiber along a longitudinal direction and having a diameter of "a"; and
   a second core surrounding the first core and having a diameter of "b", and
a relative refractive-index difference of the first core to the cladding is equal to or larger than 0.8%,
an α value is equal to or larger than 1.5,
a relative refractive-index difference of the second core to the cladding is equal to or less than −0.2%, and
a ratio b/a, defined by a ratio of the diameter "b" of the second core to the diameter "a" of the first core, is equal to or lower than 2.0.

11. The optical fiber ribbon according to claim 10, wherein
the optical fiber ribbon includes a ribbon coating made of at least one of a flame-retardant ultraviolet curable resin and a flame-retardant thermoplastic resin.

12. An optical interconnection system having a communication wavelength band of 1.3 micrometer, the optical interconnection system comprising:
an optical fiber; and
a vertical-cavity surface-emitting laser that emits an optical signal in a wavelength band of 1.3 micrometer to input to the optical fiber, wherein
the optical fiber is made of silica glass and includes a core and a cladding surrounding the core,
a mode field diameter of the optical fiber at a wavelength of 1300 nanometers is equal to or larger than 5.4 micrometers,
a light of a wavelength of 1250 nanometers is propagated through the optical fiber in a single mode, and a bending loss of the optical fiber with a bending radius of 1 millimeter at the wavelength of 1300 nanometers is equal to or lower than 1 dB/turn, wherein
the core includes
   a first core located substantially in a center of the optical fiber along a longitudinal direction and having a diameter of "a"; and
   a second core surrounding the first core and having a diameter of "b", and
a relative refractive-index difference of the first core to the cladding is equal to or larger than 0.8%,
an α value is equal to or larger than 1.5,
a relative refractive-index difference of the second core to the cladding is equal to or less than −0.2%, and
a ratio b/a, defined by a ratio of the diameter "b" of the second core to the diameter "a" of the first core, is equal to or lower than 2.0.

13. The optical interconnection system according to claim 12, wherein
the optical fiber forms an optical fiber ribbon in which a plurality of optical fibers are arranged in parallel.

14. An optical fiber ribbon in which a plurality of optical fibers are arranged in parallel, wherein
each of the optical fibers is made of silica glass and includes a core and a cladding surrounding the core,
a mode field diameter of the optical fiber at a wavelength of 1300 nanometers is equal to or larger than 5.4 micrometers,
a light of a wavelength of 1250 nanometers is propagated through the optical fiber in a single mode, and
a bending loss of the optical fiber with a bending radius of 1 millimeter at the wavelength of 1300 nanometers is equal to or lower than 1 dB/turn, wherein
the core includes
   a first core located substantially in a center of the optical fiber along a longitudinal direction and having a diameter of "a";
   a second core surrounding the first core and having a diameter of "b"; and
   a third core surrounding the second core,
a relative refractive-index difference of the first core to the cladding is equal to or larger than 0.8%,
an α value is equal to or larger than 1.5,
a relative refractive-index difference of the second core to the cladding is equal to or less than −0.2%,
a relative refractive-index difference of the third core to the cladding is equal to or less than 0.4%, and
a ratio b/a, defined by a ratio of the diameter "b" of the second core to the diameter "a" of the first core, is equal to or lower than 1.9.

15. The optical fiber ribbon according to claim 14, wherein
the optical fiber ribbon includes a ribbon coating made of at least one of a flame-retardant ultraviolet curable resin and a flame-retardant thermoplastic resin.

16. An optical fiber ribbon in which a plurality of optical fibers are arranged in parallel, wherein
each of the optical fibers is made of silica glass and includes a core and a cladding surrounding the core,
a mode field diameter of the optical fiber at a wavelength of 1300 nanometers is equal to or larger than 5.4 micrometers,
a light of a wavelength of 1250 nanometers is propagated through the optical fiber in a single mode, and
a bending loss of the optical fiber with a bending radius of 1 millimeter at the wavelength of 1300 nanometers is equal to or lower than 1 dB/turn, wherein
the core includes
   a first core located substantially in a center of the optical fiber along a longitudinal direction;
   a second core surrounding the first core; and
   a third core surrounding the second core,
a relative refractive-index difference of the first core to the cladding is equal to or larger than 0.8%,
an α value is equal to or larger than 1.5,
a relative refractive-index difference of the second core relative to the cladding is substantially 0.0%, and
a relative refractive-index difference of the third core to the cladding is equal to or less than −0.2%.

17. The optical fiber ribbon according to claim 16, wherein
the optical fiber ribbon includes a ribbon coating made of at least one of a flame-retardant ultraviolet curable resin and a flame-retardant thermoplastic resin.

18. An optical interconnection system having a communication wavelength band of 1.3 micrometer, the optical interconnection system comprising:
an optical fiber; and
a vertical-cavity surface-emitting laser that emits an optical signal in a wavelength band of 1.3 micrometer to input to the optical fiber, wherein
the optical fiber is made of silica glass and includes a core and a cladding surrounding the core,
a mode field diameter of the optical fiber at a wavelength of 1300 nanometers is equal to or larger than 5.4 micrometers,
a light of a wavelength of 1250 nanometers is propagated through the optical fiber in a single mode, and
a bending loss of the optical fiber with a bending radius of 1 millimeter at the wavelength of 1300 nanometers is equal to or lower than 1 dB/turn, wherein
the core includes
   a first core located substantially in a center of the optical fiber along a longitudinal direction and having a diameter of "a";
   a second core surrounding the first core and having a diameter of "b"; and
   a third core surrounding the second core,
a relative refractive-index difference of the first core to the cladding is equal to or larger than 0.8%,
an α value is equal to or larger than 1.5,
a relative refractive-index difference of the second core to the cladding is equal to or less than −0.2%,
a relative refractive-index difference of the third core to the cladding is equal to or less than 0.4%, and
a ratio b/a, defined by a ratio of the diameter "b" of the second core to the diameter "a" of the first core, is equal to or lower than 1.9.

19. The optical interconnection system according to claim 18, wherein
the optical fiber forms an optical fiber ribbon in which a plurality of optical fibers are arranged in parallel.

20. An optical interconnection system having a communication wavelength band of 1.3 micrometer, the optical interconnection system comprising:
an optical fiber; and
a vertical-cavity surface-emitting laser that emits an optical signal in a wavelength band of 1.3 micrometer to input to the optical fiber, wherein
the optical fiber is made of silica glass and includes a core and a cladding surrounding the core,
a mode field diameter of the optical fiber at a wavelength of 1300 nanometers is equal to or larger than 5,4 micrometers, a light of a wavelength of 1250 nanometers is propagated through the optical fiber in a single mode, and a bending loss of the optical fiber with a bending radius of 1 millimeter at the wavelength of 1300 nanometers is equal to or lower than 1 dB/turn, wherein the core includes a first core located substantially in a center of the optical fiber along a longitudinal direction;

a second core surrounding the first core; and a third core surrounding the second core, a relative refractive-index difference of the first core to the cladding is equal to or larger than 0.8%, an $\alpha$ value is equal to or larger than 1.5, a relative refractive-index difference of the second core relative to the cladding is substantially 0.0%, and a relative refractive-index difference of the third core to the cladding is equal to or less than −0.2%.

21. The optical interconnection system according to claim 20, wherein the optical fiber forms an optical fiber ribbon in which a plurality of optical fibers are arranged in parallel.

* * * * *